(12) United States Patent
Moynet et al.

(10) Patent No.: US 9,701,078 B2
(45) Date of Patent: Jul. 11, 2017

(54) METHOD FOR MANUFACTURING TIRES WITH TWO SUPPORTS FOR GREEN AND CURED TIRES

(71) Applicants: COMPAGNIE GENERALE DES ETABLISSEMENTS MICHELIN, Clermont-Ferrand (FR); MICHELIN RECHERCHE ET TECHNIQUE, S.A., Granges-Paccot (CH)

(72) Inventors: Julien Moynet, Clermont-Ferrand (FR); Jean-Pierre Guilbaud, Clermont-Ferrand (FR); Eric Lebedel, Clermont-Ferrand (FR); Aurelien Prevost, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 0 days.

(21) Appl. No.: 14/396,828

(22) PCT Filed: Apr. 23, 2013

(86) PCT No.: PCT/FR2013/050899
§ 371 (c)(1),
(2) Date: Oct. 24, 2014

(87) PCT Pub. No.: WO2013/160606
PCT Pub. Date: Oct. 31, 2013

(65) Prior Publication Data
US 2015/0125241 A1    May 7, 2015

(30) Foreign Application Priority Data
Apr. 27, 2012  (FR) ..................................... 12 53901

(51) Int. Cl.
*B29D 30/00*       (2006.01)
*B25J 11/00*       (2006.01)
*B29K 105/24*      (2006.01)

(52) U.S. Cl.
CPC .......... B29D 30/0016 (2013.01); B25J 11/00 (2013.01); *B29D 2030/0022* (2013.01); *B29D 2030/0027* (2013.01); *B29K 2105/246* (2013.01)

(58) Field of Classification Search
CPC ........ B25J 15/10; B25J 15/086; B25J 15/106; B29D 30/0603; B29D 30/0633; B29D 2030/0022
See application file for complete search history.

(56) References Cited

U.S. PATENT DOCUMENTS 3,229,329 A    1/1966  Heston
4,092,090 A    5/1978  Yuhas et al.
(Continued)

FOREIGN PATENT DOCUMENTS

CN    100551680 C    10/2009
EP    0468342 A1     1/1992
(Continued)

OTHER PUBLICATIONS

International Search Report for PCT/FR2013/050899 dated Aug. 27, 2013.

*Primary Examiner* — Gerald McClain
(74) *Attorney, Agent, or Firm* — Dickinson Wright PLLC

(57) ABSTRACT

In the method for manufacturing tires is provided herein. The method includes moving a member, which causes the transporting of at least one green tire into a predetermined loading zone of a curing station. After which, the cured tired is transferred to the member (from a curing station), and the green tire is transferred to the curing station. The member is (Continued)

then moved to transport the cured tire out of the loading zone.

11 Claims, 3 Drawing Sheets

(56) References Cited

U.S. PATENT DOCUMENTS

| | | | | |
|---|---|---|---|---|
| 4,993,906 | A * | 2/1991 | Nisimura | B29D 30/005 414/222.13 |
| 5,928,675 | A | 7/1999 | Irie | |
| 6,582,212 | B1 | 6/2003 | Mitamura | |
| 9,511,555 | B2 * | 12/2016 | Okada | B29D 30/0643 |
| 2004/0234637 | A1 * | 11/2004 | Ito | B29D 30/005 425/34.1 |
| 2007/0126153 | A1 * | 6/2007 | Toyoda | B29D 30/0016 264/326 |
| 2009/0123585 | A1 * | 5/2009 | Himeno | B29D 30/0016 425/38 |

FOREIGN PATENT DOCUMENTS

| | | | |
|---|---|---|---|
| EP | 1642695 | | 4/2006 |
| EP | 1642695 A1 * | | 4/2006 |
| GB | 1184518 | | 3/1970 |
| JP | 8155959 A | | 6/1996 |
| JP | 2004122407 A * | | 4/2004 |

* cited by examiner

METHOD FOR MANUFACTURING TIRES WITH TWO SUPPORTS FOR GREEN AND CURED TIRES

This application is a 371 national phase entry of PCT/FR2013/050899, filed 23 Apr. 2013, which claims benefit of FR 1253901, filed 27 Apr. 2013, the entire contents of which are incorporated herein by reference for all purposes.

BACKGROUND

1. Field

The disclosure relates to the manufacture of vehicle tires, and more particularly to the transportation of green tires to a curing station and then the transportation of the cured tires therefrom.

2. Description of Related Art

For manufacturing a tire for a vehicle wheel, a green tire is produced, said green tire comprising green rubber as well as different structural and reinforcing elements, such as textile fiber cables and metal reinforcements. Then the green tire is transported to a curing press in which the rubber is vulcanized. Thus a cured rubber casing is obtained which will form the tire once mounted on a wheel and inflated.

For the vulcanization process, a transport member takes the green tire to a zone from which the green tire is loaded into the press. Then the transport member is moved away. Once the curing has taken place, said same member returns to the loading zone where it receives the cured tire and takes it to a cooling station.

Such a method has drawbacks. More specifically, a return journey for loading the green tire into the press and then a further return journey for unloading the cured tire have to be taken into account. The number of movements carried out by the member is thus relatively high and accounts for a considerable proportion of the cycle time. Moreover, the member is moved to the press once the curing is complete. The cured tire thus remains in the press until the arrival of the member such that it is subjected to additional curing which is liable to be damaging.

SUMMARY

An object of embodiments of the invention is to improve the handling of the green tires and cured tires relative to the curing station.

To this end, according to embodiments of the invention, a method is provided for manufacturing tires relative to the curing station, in which:
- a member is moved, transporting at least one green tire into a predetermined loading zone of a curing station;
- at least one cured tire is transferred from the station to the member and the or each green tire is transferred from the member to the station, and
- the member is moved, transporting the or each cured tire out of the zone, the member remaining in the zone between the two transporting steps.

As the transport member is moved into the loading zone or out of said loading zone, it always transports a load, green tire or cured tire. Each movement thus serves to convey a load to its destination point. In this manner, the movements of the member are exploited to the full. Moreover, it is possible to convey the member so that it arrives at the loading zone at the moment when the curing of the tire is complete so that the cured tire may be removed from the press without being subjected to additional curing.

Advantageously, the or each cured tire is removed from a press of the station before the arrival of the member in the zone.

This step makes it possible, if required, to remove the cured tire from the press at the precise moment when the curing is complete without awaiting the arrival of the transport member. Thus any risk of excessive curing is avoided.

Preferably, the or each cured tire is transferred before that of the or each green tire.

Thus, the green tire may be arranged in the press from which the cured tire has just been removed. Thus the number of loads transported by the member is optimized relative to the available number of presses.

Advantageously, the member is moved inside the zone after the transfer of the or each cured tire and before that of the or each green tire.

Thus, when the transfers are carried out by means of the same tool from the curing station, this displacement permits the movements of the tool to be limited. More specifically, the position of the tool in which it deposits a load on the transport member is the same as that in which another load is removed.

Preferably, during the first transport step, the member carries at least two green tires.

Preferably, during the second transport step, the member carries at least two cured tires.

Said two features permit the loading and the unloading of the two presses to be carried out during the same step.

Also, according to an embodiment of the invention, a method could also be provided for manufacturing tires in which a member is used, comprising:
- at least one green pneumatic tire support comprising at least one element capable of being in contact with an upper sidewall of the green tire when said green tire rests on the support via a lower sidewall of the green tire, and
- at least one support of a cured tire, the support being without such an element, the method comprising the following steps:
  the member is moved, transporting at least one green tire into a predetermined loading zone of a curing station;
  at least one cured tire is transferred from the station to the member and the or each green tire is transferred from the member to the station, and
  the member is moved, transporting the or each cured tire out of the zone, the member remaining in the zone between the two transporting steps.

According to an embodiment of the invention, a transport member, such as a carriage, is also provided, said transport member comprising:
- at least one green pneumatic tire support, comprising at least one element capable of being in contact with an upper sidewall of the green tire when said green tire rests on the support via a lower sidewall of the green tire, and
- at least one support of a cured tire, the support being without such an element.

Said carriage permits the method of an embodiment of the invention to be implemented.

Advantageously, the green tire supports are at least two in number and/or the cured tire supports are at least two in number.

Advantageously, the or each cured tire support comprises a roller table.

According to an embodiment of the invention, an installation is also provided for manufacturing tires, said installation comprising a curing station and a transport member according to the invention.

In one embodiment, the installation comprises a dedicated track for the mechanical guidance of the member to a loading zone of the curing station.

It is possible to provide the station as comprising at least two curing presses.

BRIEF DESCRIPTION OF DRAWINGS

An embodiment of the method of the invention will now be disclosed by way of non-limiting example and with reference to the drawings, in which.

DETAILED DESCRIPTION OF SPECIFIC EMBODIMENTS

By means of FIGS. 1, 2, 3, 4, and 5, a method according to an embodiment of the invention and an installation for the implementation thereof will now be disclosed. The installation serves for manufacturing tire tires for vehicle wheels. The vehicles could be lightweight vehicles, passenger vehicles, utility vehicles, heavy goods vehicles or even civil engineering vehicles. The installation relates more particularly to the curing of tires comprising green rubber and serving for the manufacture of the cured tires.

Figure 2:
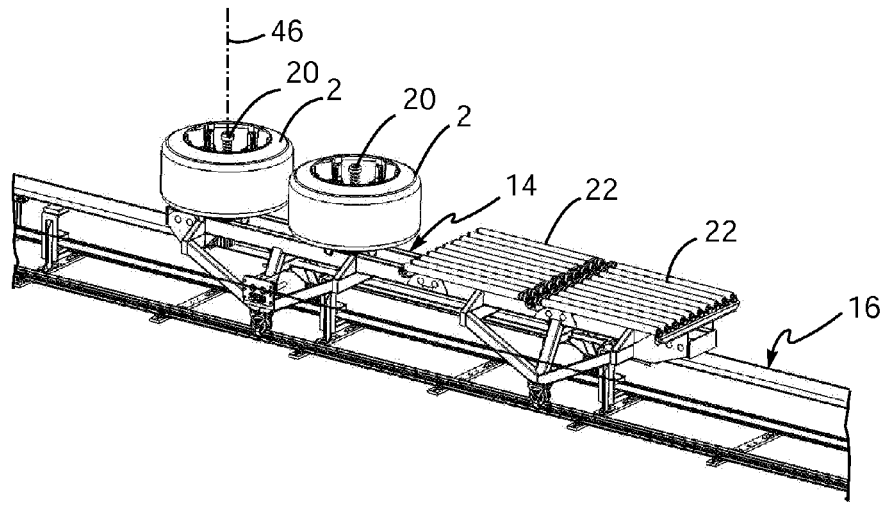
FIGS. 2, 3, 4, and 5 illustrate four respective steps for implementing the method of the invention by means of this member.
Figure 3:
Figure 3:
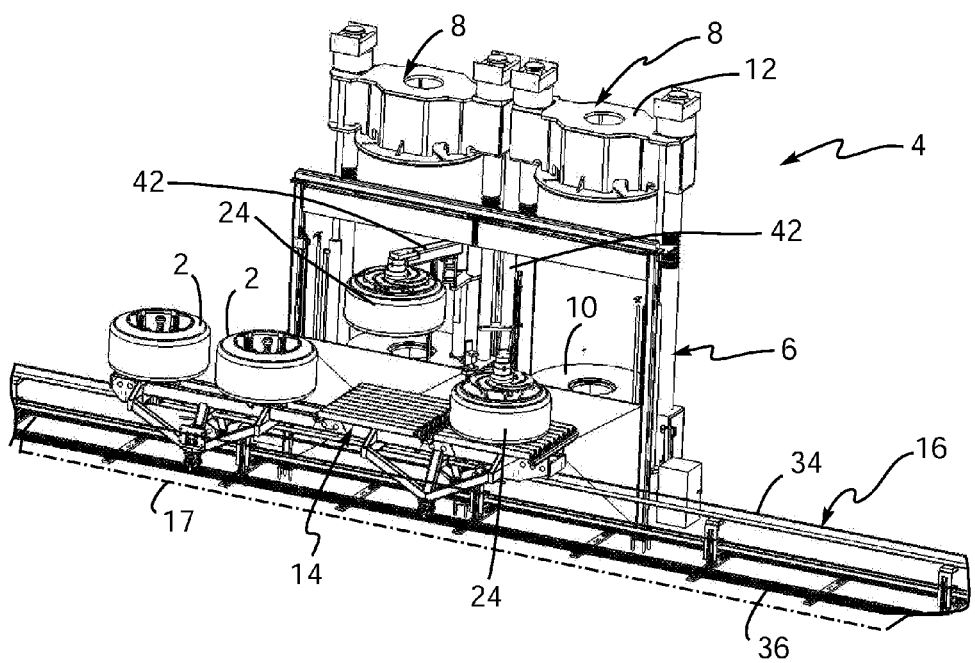
Figure 4:
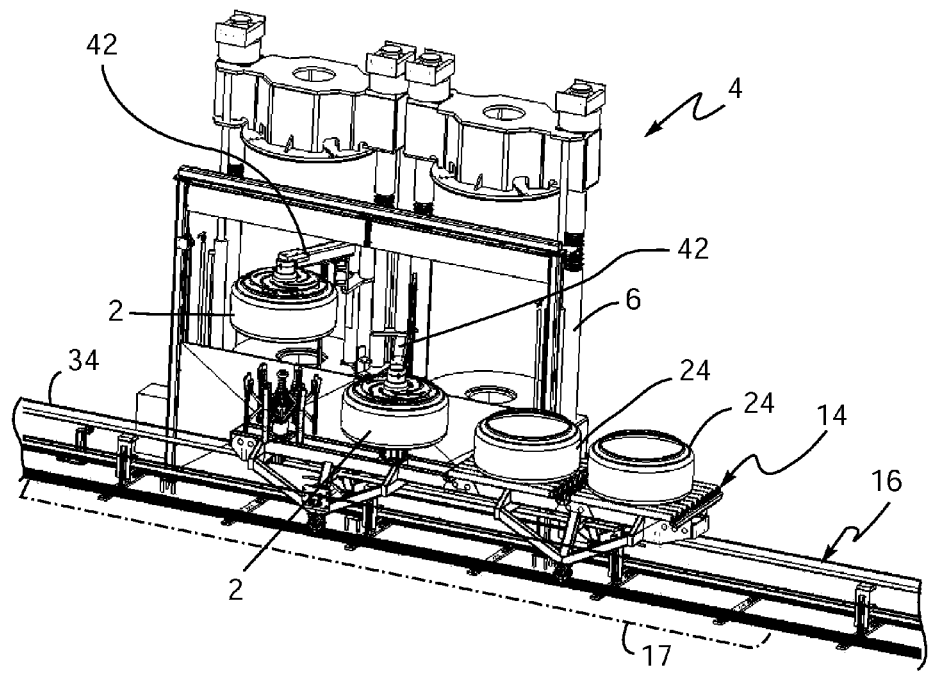
Figure 5:
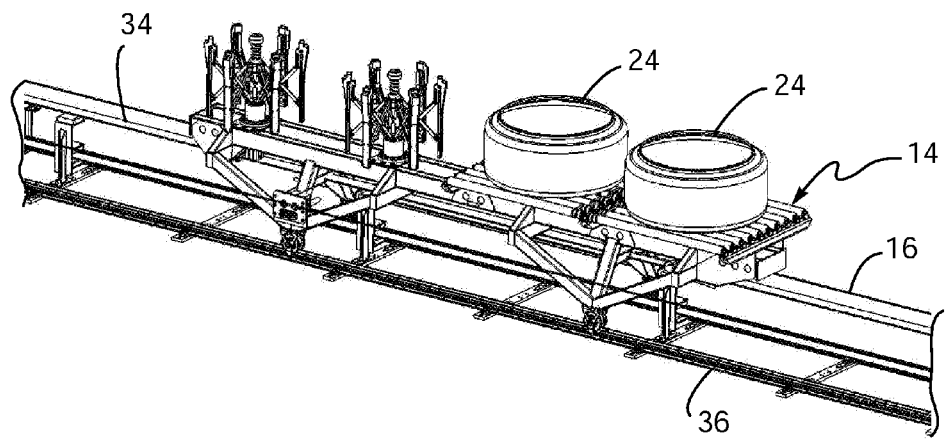

Green tires 2 are illustrated in FIGS. 2, 3, and 4. Each green tire comprises green rubber and structural and reinforcing elements. The green tire has a generally cylindrical shape and two sidewalls of a generally tapered shape extending to the axial ends of the cylinder.

The installation 4 (FIGS. 3 and 4) comprises a curing station 6 comprising one or more curing presses 8 (FIGS. 3 and 4), in this case two in number. Each curing press 8 comprises, in this case, a lower part 10 and an upper part 12 movably mounted relative to one another in the vertical direction. The two parts 10 and 12 are spaced apart from one another as illustrated in FIGS. 3 and 4 to permit the loading of a green tire into the press and the unloading of a cured tire therefrom. Said two parts are in contact with one another during the curing which makes it possible to carry out the vulcanization of the rubber and to obtain a cured tire.

The installation comprises a transport member 14 movably mounted relative to the curing station 6 on a guide track 16.

The member 14 is, in this case, formed by a carriage which comprises a frame 18 carrying supports which are four in number in this case. There are two identical supports 20 each capable of supporting a green tire and two identical supports 22 each capable of supporting a cured tire 24. The four supports are aligned in a longitudinal direction of the carriage in this case and the base of the four supports extends at the same height in the vertical direction.

Figure 1:
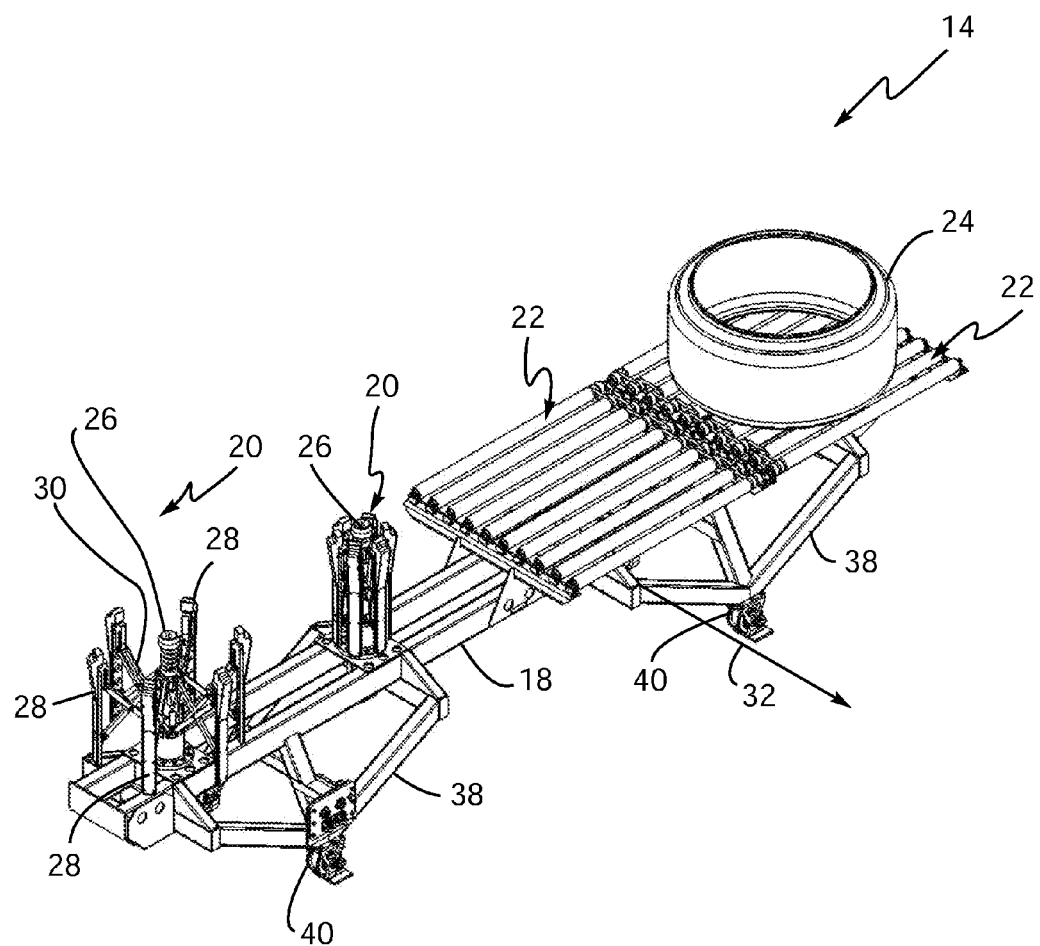
FIG. 1 is a perspective view of a transport member according to an embodiment of the invention.

Each green tire support comprises a central vertical mast 26 and peripheral vertical arms 28, in this case six in number, each connected to the mast by rods 30 to obtain a translatory movement relative to the mast in a radial horizontal direction in relation to the vertical axis of the mast. The arms 28 all extend at the same height and are identical to one another. The support is arranged such that the arms 28 are simultaneously moved away from the mast or simultaneously moved toward the mast. In FIG. 1, the support 20 located furthest to the left has thus been illustrated with an extended configuration whilst the support located to the right is shown with a retracted configuration. This has been done for illustrative purposes only, so that both configurations can be seen in the same drawing, and does not imply that such a combination of configurations necessarily occurs.

Each of the cured tire supports is formed by a roller table in this case. The rollers are all identical to one another and define a horizontal plane. The axes of the rollers are horizontal and parallel to the longitudinal direction of the carriage. This orientation of the axes permits an unloading of the cured tires, for example to a cooling station, following a sliding movement perpendicular to the longitudinal direction of the carriage, as illustrated by the arrow 32 in FIG. 1.

The guide track 16 extends onto the ground in this case and is rigidly fixed thereto. It forms a railed track in this case. It extends in a rectilinear horizontal direction. It comprises a central longitudinal member 34 and two lateral rails 36. The carriage 14 comprises four posts 38 each carrying a wheel 40 capable of bearing against one of the two rails and being in engagement therewith. Thus the two left-hand wheels bear against the left-hand rail and the two right-hand wheels bear against the right-hand rail. The carriage thus extends above the longitudinal member 16, spanning said longitudinal member. The carriage 14 is thus movably mounted in a slidable manner on the track 16 so as to travel thereon.

The track extends as far as a station for loading green tires which are designed to be cured. It also extends as far as a cooling station for the cured tires. Moreover, it passes in the vicinity of the station 6 as illustrated in FIGS. 3 and 4. More specifically, the track 16 passes through a predetermined loading and unloading zone 17 of the station 6. This loading and unloading is carried out by at least one member such as a support arm 42 of the station 6. The support arms in this case are two in number. In this zone 17, the green tires located on the carriage may thus be transported by one of the support arms 42 from the carriage to the corresponding press 8. In this same zone 17, the cured tires may be transported from the presses to the carriage. Thus the loading and unloading zone 17 is defined as all of the positions that the carriage mounted on the rails may occupy to permit such a loading, such an unloading or both. In contrast, when the carriage is located outside of the loading and unloading zone, it is no longer possible for any of the support arms 42 to deposit a load on the carriage or to remove a load therefrom.

The installation comprises a motor 44 (shown schematically in FIG. 2) fixedly mounted on the ground and providing the movement of the carriage on the track 16, for example by means of pulleys and a belt.

The installation also comprises means for remotely controlling the movement of the carriage, for actuating the support arms 42, for opening and closing the presses 8 and for the different curing steps, including the essential elements thereof.

An embodiment of the method of the invention will now be described by means of this installation.

In a first step, not illustrated, two green tires 2 are loaded onto the supports 20 of the carriage at a loading station remote from the zone 17. To achieve this, the supports 20 are initially in a retracted configuration. A green tire is offered up to one of the supports such that the principal axis 46 of the green tire is vertical and coincides with the axis of the mast. The tire is lowered opposite the arms 28 and then the extension of said arms is controlled to place the upper end thereof in contact with the edge of the upper sidewall of the green tire. The lower sidewall of the green tire also rests on the frame of the carriage with which it is in direct contact. The upper end of the arms also holds the edge of the upper sidewall at a certain distance from the frame in the vertical direction to avoid the green tire sagging under its own weight.

In a following step, the carriage 14 thus loaded is moved on the track 16 as illustrated in FIG. 2. The supports 22 carry no load at this stage. This movement takes place until the carriage, and more specifically the supports 22, penetrate the loading zone 17 so that they extend opposite the curing station 6 and within reach of the support arms 42.

During this movement of the carriage, other green tires are being cured in the two respective presses 8. This curing is completed before the carriage arrives in the loading zone. Prior to this arrival, the presses are opened and the support arms 42 remove the respective cured tires therefrom. The cured tires are thus carried by the support arms and out of the presses awaiting the arrival of the carriage.

The carriage 14 then arrives and stops when the supports 22 extend across the loading zone 17 and opposite the station 6.

In a subsequent step, illustrated in FIG. 3, the support arms 42 move the cured tires and deposit said cured tires on the respective supports 22.

In a subsequent step, the carriage is moved on the track 16 in order to place the supports 20 opposite the station 6 and within reach of the support arms 42. The carriage does not leave the loading zone during this movement. It advances only one step. The carriage thus passes from the position illustrated in FIG. 3 to that illustrated in FIG. 4.

In a subsequent step, illustrated in FIG. 4, the two support arms 42 grip the green tires initially carried by the supports and arrange them in the respective presses.

Then, the presses are closed to carry out the vulcanization of the green tires. Simultaneously, the carriage now carrying only the two cured tires on the supports 22 leaves the zone 17 and is moved on the track 16 to the cooling station for the cured tires where said cured tires are unloaded, for example in the direction 32 via the rollers.

According to this embodiment, it is advantageous if the two cured tires are removed from the presses before the arrival of the carriage in the loading zone and that they are carried by the support arms until this arrival in order to avoid excessive curing of the cured tires.

It is noteworthy that these different steps may be carried out without any manual intervention on the products. The steps causing the action of the curing station take place in a secure manner and without disrupting the supply to the remainder of the production line. The optimization of the movements of the carriages permits time to be gained in the cycle of each press. The movement of a plurality of green tires and a plurality of cured tires at the same time permits said movements to be optimized further.

The supports 20 permit, in particular, the diameter thereof to be adjusted to the internal diameter of the green tires which they are designed to carry.

Naturally, numerous modifications could be made to the invention without departing from the scope thereof.

It could be provided that the transport member is not a carriage. The transport member could be, for example, a member provided with a compartment, suspended and guided by a slide rail. The transport member could be a vehicle moving on the ground without the assistance of a railed track.

The invention is able to be used if the curing station comprises a single press, the transport member thus being able to have a single green tire support and a single cured tire support.

A different configuration could be provided for the green tire supports and cured tire supports of the carriage.

The invention claimed is:

1. A method for manufacturing tires, comprising:
   moving a member in a first direction supporting at least one green tire and thereby transporting the at least one green tire into a predetermined loading zone of a curing station, the curing station being at a distance away from the member;
   after moving the member, transferring the at least one cured tire from the curing station to the member and the at least one green tire from the member to the curing station, and
   after the transferring, moving the member in the first direction while supporting the at least one cured tire out of the loading zone while the at least one green tire undergoes a process of curing in the curing station for a predetermined time, the process of curing occurring while the at least one green tire is removed from the member, wherein the member remains in the loading zone between the two transporting steps.

2. The method according to claim 1, wherein, during the second transporting step, the member carries at least two cured tires.

3. The method according to claim 1, wherein transferring the or each cured tire is before the transferring of the or each green tire.

4. The method according to claim 1, further comprising moving the member inside the zone after transferring the or each cured tire and before transferring the or each green tire.

5. The method according to claim 1, wherein, during the first transporting step, the member carries at least two green tires.

6. The method according to claim 1, further comprising removing the or each cured tire from a press of the station before the arrival of the member in the loading zone.

7. The method according to claim 6, wherein transferring the or each cured tire is before the transferring of the or each green tire.

8. The method according to claim 6, further comprising moving the member inside the zone after transferring the or each cured tire and before transferring the or each green tire.

9. The method according to claim 6, wherein, during the first transporting step, the member carries at least two green tires.

10. The method according to claim 6, wherein, during the second transporting step, the member carries at least two cured tires.

11. A method for manufacturing tires using a transport member, said transport member comprising:
    providing a transport member comprising:
      at least one green pneumatic tire support, comprising at least one element capable of being in contact with an upper sidewall of the green tire when said green tire rests on the support via a lower sidewall of the green tire, and
      at least one support of a cured tire, the support being without such an element,
    moving the transport member in a first direction supporting at least one green tire and thereby transporting the at least one green tire into a predetermined loading zone of a curing station, the curing station being at a distance away from the member;

after moving the member, transferring the at least one cured tire from the curing station to the transport member the at least one green tire from the transport member to the curing station, and after the transferring, moving the transport member in the first direction supporting the at least one cured tire to transport out of the loading zone while the at least one green tire undergoes a process of curing in the curing station for a predetermined time, the process of curing occurring while the at least one green tire is removed from the transport member, wherein the transport member remains in the loading zone between the two transporting steps.

\* \* \* \* \*